March 12, 1957  R. L. SKINNER  2,784,707
HYDRAULIC VALVE LIFTER FOR AUTOMOTIVE VEHICLES
Filed May 21, 1953  2 Sheets-Sheet 1
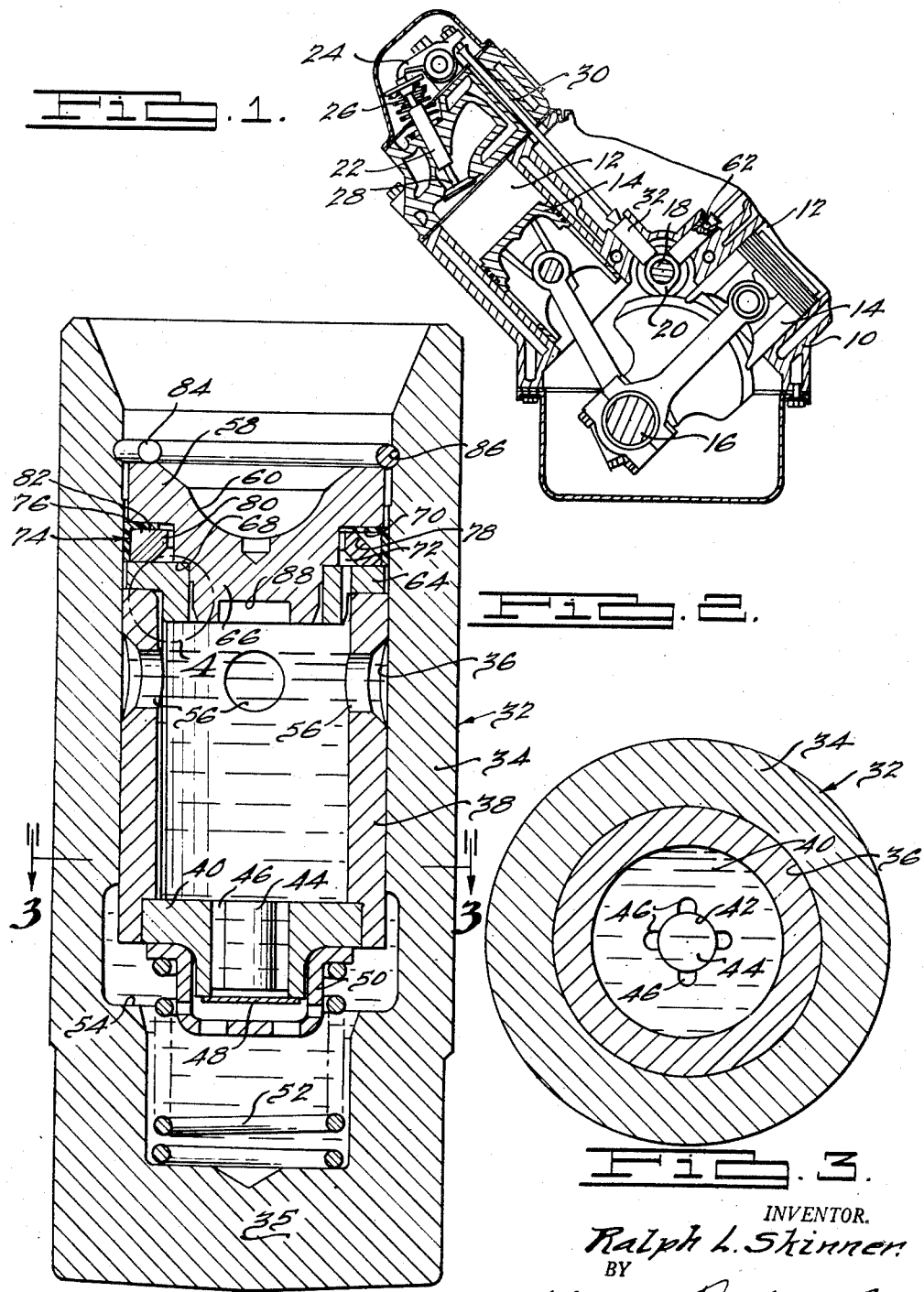
INVENTOR.
Ralph L. Skinner,
BY
Harness, Dickey & Pierce
ATTORNEYS.

March 12, 1957 R. L. SKINNER 2,784,707
HYDRAULIC VALVE LIFTER FOR AUTOMOTIVE VEHICLES
Filed May 21, 1953 2 Sheets-Sheet 2

INVENTOR.
Ralph L. Skinner
BY
Harness, Dickey & Pierce
ATTORNEYS.

United States Patent Office 2,784,707
Patented Mar. 12, 1957

2,784,707

HYDRAULIC VALVE LIFTER FOR AUTOMOTIVE VEHICLES

Ralph L. Skinner, Detroit, Mich., assignor to Renniks Company, a partnership composed of Ralph L. Skinner, Caroline T. Skinner, Ralph L. Skinner, Jr., and Robert T. Skinner Application May 21, 1953, Serial No. 356,509

2 Claims. (Cl. 123—90)

This invention relates to new and useful improvements in hydraulic valve lifters for internal-combustion engines and the like.

Conventional hydraulic valve lifters are connected in the lubricating system of the engine, and oil from the crankcase is supplied thereto continuously under pressure in order to insure efficient operation thereof. However, this arrangement is subject to the disadvantage that oil normally used in the crankcase breaks down and forms a varnish on parts of the valve lifter as a result of high temperature conditions sometimes developed therein. When this occurs, the adjustable parts of the valve lifter tend to stick and the latter becomes sluggish or even inoperative. A sticking valve lifter seriously affects the operating efficiency of the engine. When the engine is stopped, the cams compress the adjustable parts of the valve lifters varying amounts, and if these parts tend to stick they will not expand readily, if at all, when the engine is started. When this occurs the cams are not able to open the fuel inlet and exhaust valves completely and loss of power and generally faulty operation of the engine inevitably result.

An even more serious result produced by failure of the valve lifters in the respects noted above is the noise which results when the cams strike the valve lifters and wear of the cams which inevitably occurs under these conditions. When the adjustable parts of the valve lifters are not completely expanded at all times to hold the same constantly against the surfaces of the cams, the latter wear exceedingly rapidly and metal particles worn from the cam surfaces are deposited in the lubricating system of the engine. These particles are in effect an abrasive grit which wears and otherwise adversely affects moving parts of the engine and ultimately may cause complete failure of the engine.

Conventional valve lifters of the hydraulic type are equipped with a ball valve which prevents the adjustable or extensible parts of the valve lifter from collapsing. This particular construction, however, is subject to the disadvantage that the ball falls away from its seat by gravity and must be closed by pressure of liquid thereagainst. However, the mere fact that the ball valve is off its seat permits a certain amount of the liquid to escape each time the valve operates, and this in turn permits the valve lifter to collapse or retract slightly. Inertia of the ball valve makes it absolutely impossible to eliminate this condition; and as a result, the valve lifter is never entirely effective in maintaining a proper adjustment for the valve lifter with which it is associated. Another disadvantage of this construction is that the ball valve tends to chatter or vibrate at certain engine speeds; and when this occurs, the ball valve is off its seat a substantial portion of the time. As a result, the valve lifter collapses wholly or partially, causing the engine to function inefficiently and producing chattering of the valve tappets and related parts.

An important object of the present invention is to provide a hydraulic valve lifter that is entirely independent of the lubricating system of the engine but instead is a self-contained unit containing a hydraulic liquid that is not affected adversely by conditions normally encountered in use.

Another object of the invention is to provide a hydraulic valve lifter that adjusts relatively quickly when the engine is started to take up slack between the cams and the push rods which operate the rocker arms to open and close the inlet and exhaust valves.

Still another object of the invention is to provide a hydraulic valve lifter which is prevented from collapsing by a novel valve arrangement that eliminates the small amount of slack universally present in current constructions and prevents the valve lifter from collapsing under certain conditions of engine operation.

In the drawings forming a part of this specification and wherein like numerals are employed to designate like parts throughout the same:

Fig. 1 is a fragmentary, vertical, sectional view showing a valve lifter embodying the instant invention mounted in a conventional automobile engine and in operative association with related parts of the engine;

Fig. 2 is an enlarged, longitudinal, sectional view through the valve lifter;

Fig. 3 is a transverse, sectional view taken on the line 3—3 of Fig. 2;

Figure 4:
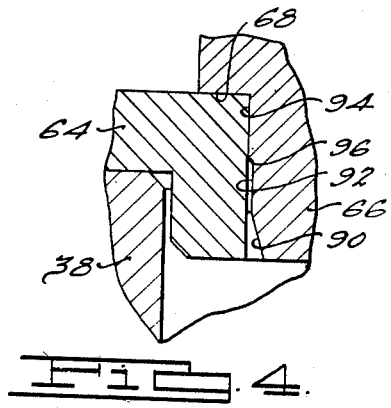
Fig. 4 is an enlarged view of the portion of Fig. 2 enclosed in the circle 4.
Figure 6:
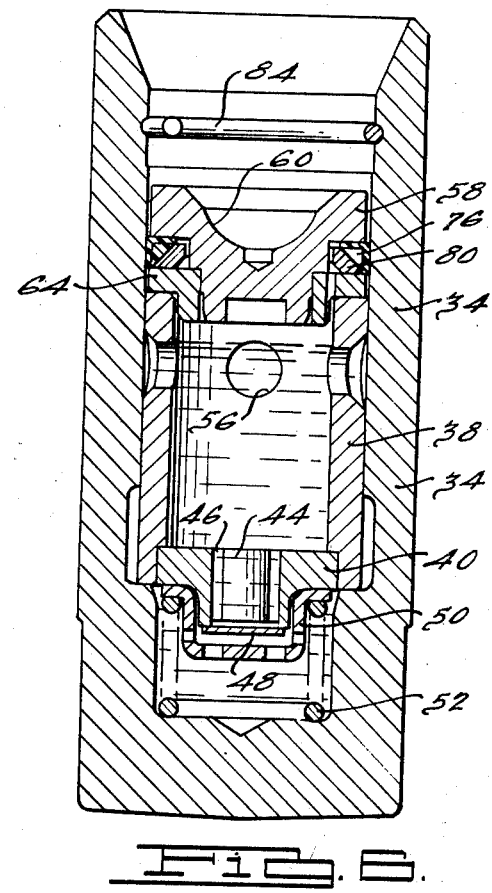
Figure 5:
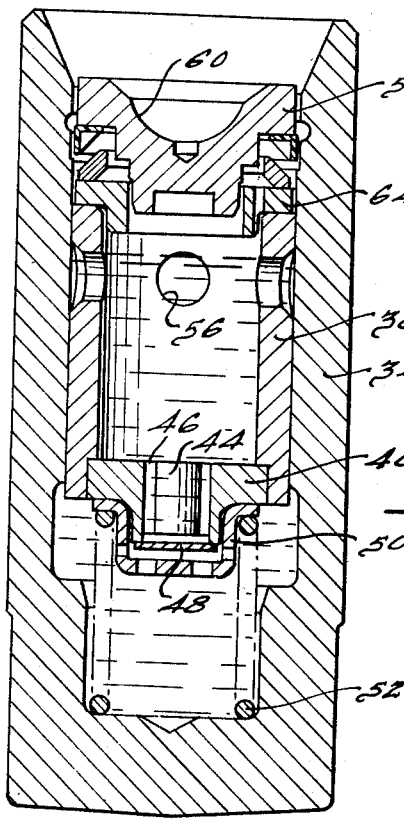

Fig. 5 is a view similar to Fig. 4, but showing the parts positioned as they are when the valve lifter is being assembled and illustrating the manner in which the parts are combined and correlated to permit escape of air during initial assembly; and Fig. 6 is a view similar to Fig. 5 but illustrating the relationship between the parts when the latter are finally assembled and particularly illustrating the manner in which the parts co-operate to provide a hermetically sealed unit when the parts are finally pushed together.

Attention is first directed to Fig. 1 which shows an automobile engine having a block 10 provided with V banks of power cylinders 12. Pistons 14 driven by the crankshaft 16 are mounted for reciprocation in the cylinders 12. The engine also is provided with the usual camshaft 18 having cams 20 thereon that operate the intake and exhaust valves which control the inflow of fuel into and the discharge of the products of combustion from the cylinders 12. The drawing shows one of the cams 20 and illustrates the same in operative association with an intake valve 22. The latter is pushed downwardly by a rocker arm 24 against the action of a relatively powerful spring 26 to open the inlet port 28 of the engine and force is applied to the rocker arm from the cam 20 to accomplish the above result by a push rod 30 and valve lifter 32. All of the above parts are more or less conventional, with the exception of the valve lifter 32 which comprises the subject matter of this invention.

The valve lifter 32 comprises a generally cylindrical hollow body 34 having a closed bottom 35. As shown in the drawing, the body 34 has a cylindrical inner wall 36, and a generally tubular plunger 38 is slidably mounted within the body. A valve seat 40 is pressed into the lower end of the plunger 38 and the valve seat is provided centrally thereof with an opening 42 (Fig. 3) which receives a permanent magnet 44.

Hydraulic liquid normally contained in the body 34 is permitted to pass from the interior of plunger 38 into the portion of housing 34 below the valve seat 40 through an annular series of openings 46 around the magnet 44. Flow of liquid through the openings 46, however, is controlled by a magnetically operated valve 48 which seats upwardly against the valve seat 40 as shown in Fig. 2; and when thus disposed, closes the openings 46. The valve 42 is confined by a generally cup-shaped, ported retainer 50 which is piloted on the lower end of the valve seat 40. In addition to confining the valve 48 the retainer 50 guides and positions the upper end of a spring 52 which is confined between the valve seat and the bottom of the housing 34. Spring 52 normally is under tension but can be compressed so that the lower end of the plunger 38 can seat against a radial shoulder 54 in the body 34. When the plunger 38 moves downwardly in the body 34, hydraulic liquid normally contained in the body below the plunger can pass upwardly between the plunger and the body and flow into the plunger through side openings 56 provided in the plunger adjacent the top thereof. If not compressed in some manner, however, the spring 52 holds the plunger 38 in the fully extended position shown in Fig. 2.

Surmounting the plunger 83 is a push-rod seat 58 having a centrally disposed, spherically curved socket 60 which receives and retains the conventional sperical end 62 with which push rods 30 are conventionally equipped. A retainer ring 64 surrounds an embossment 66 provided centrally on the underside of the seat 58 and normally seats upwardly against a radial shoulder 68 on the seat. As shown, the retainer 64 engages downwardly on the upper end of the plunger 38.

It will be observed that the push-rod seat 58 is formed with an annular peripheral recess 70 and that the retainer 64 cooperates with the recess to define an annular groove 72. Mounted in the groove 72 is a suitable seal 74 which bears upwardly against the radial wall of the recess 70 and outwardly against the cylindrical wall 36 to hermetically seal the portion of the body 34 disposed therebelow. While it is contemplated that any suitable seal may be employed for this purpose it has been found that a particularly effective seal is provided by a continuous annular ring 76 of a suitable plastic material. The material known in the trade as "Teflon" has been found to be pre-eminently satisfactory for the seal. In this connection it will be readily appreciated that the material used in the seal must be capable of withstanding the relatively high temperatures to which the valve lifter is subjected in use, it must be able to reciprocate back and forth in the body 34 without appreciable or significant impairment of its sealing function, and it must of course perform its sealing action in an efficient manner. The Teflon seal here shown is generally triangular in cross section having a flat annular top surface which seats against and flatly engages the radial wall of the recess 70, an annular outer surface which engages flatly against the cylindrical wall 36, and an upwardly and inwardly inclined surface 78 which engages flatly against a split spring expander ring 80. The latter seats downwardly against the retainer ring 64.

When the retainer ring 64 is forced onto the embossment 66 and against the shoulder 68 during assembly of the valve lifter, it forces the expander ring 80 against the inclined surface 78 of the sealing element 76. Pressure thus exerted on the slit expander ring 80 causes the latter to constrict slightly, and energy thus stored in the ring reacts against the inclined surface 78 of the sealing element 76 thereafter continuously during operation of the valve lifter to force the sealing element upwardly against the radial wall of the recess 70 and outwardly against the surface 36. Further, wear of the Teflon in use is compensated automatically by the expander ring 80 which continues to press the sealing element 76 outwardly against the body 34 by reason of the initial constriction which occurs when the top closure is assembled.

The Teflon material here recommended has the ability to cold-flow under pressure so that it adapts itself intimately to the contour of the body 34, and it is held at all times in pressed engagement with the body by the expander ring 80. Also, this property or characteristic of the Teflon sealing element 76 permits the expander ring 80 to maintain a sealing relationship between the sealing element and the body 34 even though some wear or abrasion of the sealing element occurs in use. If necessary or desirable the flexibility of the sealing element can be enhanced in any suitable manner as by making a plurality of triangular cuts 82 in the undersurface thereof. Upward movement of the push rod seat 58 on the body 34 is limited by a snap ring 84 which fits into an annular groove 86 in the body and overlies the outer marginal portion of the seat.

As shown in Fig. 2, the body 34 is partially filled with a suitable hydraulic liquid. It is not possible to fill the body completely because some room must be left for expansion of the liquid when it becomes heated in use. Further, it is desirable to leave a small pocket of air in the body above the liquid to cushion expansion of the hydraulic liquid. However, it is essential to proper functioning of the device that only a small amount of air be left in the body 34. Otherwise the air tends to emulsify with the liquid. This causes the liquid to froth or foam within the body and interferes with the operation of the device. Preferably, a small recess 88 is provided in the undersurface of the embossment 66 which serves as an air pocket or reservoir.

By reason of the unique construction of the top closure assembly, exactly the right amount of air is left in the body 34 when the parts of the valve lifter are assembled. When assembling the parts of the valve lifter, the spring 52 is first dropped into the body 34, and the cap 50 is then pressed into the upper end of the spring. A carefully calculated and predetermined amount of hydraulic liquid is next placed in the body 34; and the plunger 38, with the valve seat 40, magnet 44 and valve 48 in position, is then inserted into the body. At this time the central embossment on the valve seat 40 is piloted into the cap 50 to complete the lower assembly. As the plunger 38 is pushed downwardly into the body 34, hydraulic liquid in the body below the plunger is displaced upwardly between the body and the plunger to the openings 56 and thence into the plunger. The annular space between the plunger 38 and body 34 must be exceedingly small and the normal clearance provided between these parts is approximately thirty-five millionths of an inch. The oil flows through this space quite slowly, but when downward pressure is exerted on the plunger it moves slowly downwardly in the body to displace the liquid. Fig. 2 illustrates the approximate level of hydraulic liquid in the body with the plunger 38 in place.

The top closure assembly comprising the push rod seat 58, the retainer ring 64, the sealing element 76 and the expander ring 80 is then assembled loosely together as a subassembly and the latter is placed in the body 34 on top of the plunger 38. In this connection it will be observed that the embossment 66 has a tapered lower marginal portion 90 which is smaller than the retainer ring 64, an intermediate annular surface 92 which is approximately the same size as the internal diameter of the ring 64, and an upper annular surface 94 which initially is slightly larger than the internal dimension of the retainer ring. In the drawings, and particularly in Fig. 4, the surface 92 is shown smaller than retainer ring 64 in order to distinguish this surface from the adjacent annular surface 94; however, it is to be understood that this dimension is exaggerated in the drawings merely for purpose of illustration and by way of explanation. In actual practice, the surface 92 fits the retainer ring with what is known as an "interference" fit. As suggested, this means that the surface 92 is substantially exactly to size with the internal dimension of the retainer ring so that the latter can be pressed onto the embossment 66 substantially to the point 96 with the fingers using very little effort. However, it is intended that the retainer ring 64 have a press fit with the upper surface 94 so that the ring can be inserted on the embossment 66 above the point 96 only by application of considerable pressure.

During initial assembly, the retainer ring 64 is inserted on the embossment 66 only to the point 96 and the subassembly is then inserted into the valve body in the manner described. When the parts are thus assembled, the sealing element 76 and expander ring 80 are loose in the annular groove 70 which contains them. Also, when the parts are thus assembled the sealing element 76 is not pressed against the radial face 70 of the groove nor is it pressed against the body 34. As a consequence, air in the body 34 readily escapes from the body upwardly past the seal and when the subassembly is finally brought to rest against the plunger 38 substantially normal atmospheric pressure exists in the body.

The entire top closure assembly is then pressed downwardly into the body 34 until the plunger 38 seats on the shoulder 54. During this operation, air in the body 34 continues to escape upwardly past the seal 74. When the plunger 38 seats against the body 34 as described, continued application of force against the push-rod seat 58 forces the embossment 66 all the way into the retainer ring 64 until the radial shoulder 68 seats on the retainer ring. Air is continuously displaced from the body during the first portion of this operation. However, the last increment of movement, before the shoulder 68 engages the retainer ring 64, presses the sealing element 76 and the expander ring 80 together between the radial shoulder 70 and the ring 64. As the two elements are pressed together, the expander ring 80 is constricted and the sealing element 76 is expanded radially outwardly into pressed frictional engagement with the body 34. It is only when this action occurs that the portion of the body below the seal is hermetically sealed. Air escapes from the body to that point but after the sealing element is expanded no more air can enter or leave the body past the seal 74. Tests have demonstrated that this procedure leaves exactly the right amount of air in the body to provide a cushion for the hydraulic liquid but does not leave sufficient air to cause undesirable emulsification of the liquid in use. After the parts have been finally assembled in the manner described, the snap ring 86 is inserted and when the assembly is released the spring 52 retracts the plunger 38 until the push rod 58 seats against the snap retaining element 84.

In use, the valve lifter 32 is placed between the cam 20 and the push rod 30 associated with the cam (Fig. 1). When thus positioned, the plunger 38 normally is retracted into the body 34 at least a slight distance from the snap ring 84 even when the valve lifter is on a low point of the cam, as shown in Fig. 2, so that the action of spring 52 exerted constantly against the plunger 38 presses the push-rod seat 58 at all times against the push rod 30 and automatically takes up any slack or looseness in the mechanism between the cam 20 and the valve 28. If the engine is stopped with the valve lifter 32 on the high point of the cam 20 the spring 26 acts through the rocker arm 24 and push rod 30 to retract the plunger 38 into the body 34 against the action of spring 52. Thus, all of the valves 58 are closed regardless of the position of the cams 20 preparatory to starting of the engine.

Manifestly, it is necessary for the valve lifters which are not on the low points of their respective cams to expand quickly when the engine is started in order to prevent excessive noise and destructive pounding of the cams. This is accomplished instantly according to the present invention by unseating of the valve 48. As soon as the cam shaft 18 rotates to swing the lobe 20 away from the valve lifter 32, the spring 52 acts instantly to project or extend the plunger 38 and rapid outward movement or expansion of the plunger in the body 34 is permitted because hydraulic liquid in the plunger can flow easily downwardly through the openings 38 past the valve 48 and into the body 34 below the plunger. The magnet 44 acts constantly on the valve to hold it closed but the attraction of the magnet is readily overcome by hydraulic pressure against the top of the valve. During this phase of the operation the retainer 50 confines the valve 48 and prevents it from moving downwardly away from the range of attraction of magnet 44. After the plunger 38 has been extended in the manner described the valve 48 seats and prevents the plunger from again retracting in the body when the camshaft 18 rotates farther to swing the lobe of the cam 20 against the valve lifter.

When the lobe of the cam 20 moves against the body 34, pressure of the hydraulic liquid in the body below the plunger 34 acts against the valve 48 to press it solidly against the seat 40, thus preventing liquid above the valve from again opening the valve and causing the plunger 38 to telescope back into the body. The only way the plunger 38 can retract in the body 34 under these conditions is by displacement of oil upwardly between the plunger and the body, and the clearance between these parts is so slight that no significant movement between the parts occurs in the relatively short time the cam lobe is moving against the valve lifter during operation of the engine. Actual tests have shown that it requires approximately forty seconds for the spring 26 to retract the plunger 38 sufficiently to permit the valve 22 to close, and from this it will be readily appreciated that very little relative reciprocatory movement occurs between the plunger 38 and body 34 when the camshaft is rotated at speeds in the order of three thousand revolutions per minute. The valve 48 preferably is in the form of a thin flat disk as shown so that it responds essentially quickly to the attraction of the magnet 44. Further, a valve so constructed is instantly responsive to forces exerted on it.

From the foregoing it will be observed that the instant valve lifter differs from conventional hydraulic valve lifters in that the valve 48 is held normally closed by the magnet 44. In the instant device it is not necessary for liquid in the body 34 below the plunger 38 to move upwardly past and against the valve in order to close it. As a consequence the slight telescoping of the plunger 38 and the body 34 which invariably occurred heretofore as a result of hydraulic liquid moving upwardly through the holes 48 before the ball valve had a chance to seat is entirely eliminated.

A magnet 44 can be used only in a hermatically sealed unit of the type here shown. It cannot be used in a conventional hydraulic valve lifter because, in the latter, oil from the crankcase is circulated constantly through the valve lifters. In this enviornment, metal particles which gradually accumulate in the crankcase oil are carried into the valve lifters and these metal particles would soon accumulate on the magnet 44 and render the valve lifter inoperative.

In addition to the above it will be apparent that the instant construction determines the conditions obtaining in the valve lifter from the time the parts are assembled. The amount of oil and air in the valve lifter remains the same at all times, and these conditions can be carefully controlled. As a consequence, special oil or hydraulic liquid that will not varnish or emulsify under conditions of use can be employed. This is not possible in conventional hydraulic valve lifters which employ the same oil used in the crankcase.

Having thus described the invention, I claim:

1. In a self-contained hydraulic valve lifter of the type having telescopic members defining a pair of hermetically sealed chambers, the improvement comprising a valve structure for controlling flow of hydraulic liquid from one chamber to the other having a port through which hydraulic liquid is adapted to pass and a valve seat around said port, a flat metallic disk valve disposed to engage said seat and to close said port and movable away from said seat to open said port; a magnet carried by the valve structure and disposed to act on the valve to hold the same normally closed, and means co-operating with the valve to limit movement thereof away from said port and said magnet whereby to prevent the valve from moving away from the effective range of the magnet.

2. In a self-contained hydraulic valve lifter of the type having telescopic members defining a pair of hermetically sealed chambers, the improvement comprising a valve port having a seat and establishing communication between said chambers, a magnet carried by said seat, a flat metallic disk valve engageable with said seat to close said port and movable away from said seat to open said port, said valve being disposed closest to the magnet so as to be attracted most strongly thereby when in a closed position and movable away from the magnet to open said port so as to be least strongly attracted by the magnet when in the open position, and means co-operating with the valve to limit movement thereof away from the magnet whereby to prevent the valve from moving entirely away from the effective range of said magnet.

References Cited in the file of this patent

UNITED STATES PATENTS

| | | |
|---|---|---|
| 2,203,952 | Eshbaugh | June 11, 1940 |
| 2,321,160 | Schnitzer | June 8, 1943 |
| 2,376,147 | Johnston | May 15, 1945 |
| 2,438,631 | Bergmann | May 30, 1948 |
| 2,547,798 | Truxell | Apr. 3, 1951 |
| 2,589,188 | De Craene et al. | Mar. 11, 1952 |
| 2,599,898 | Dalrymple | June 10, 1952 |
| 2,646,071 | Wagner | July 21, 1953 |